Figure 1:
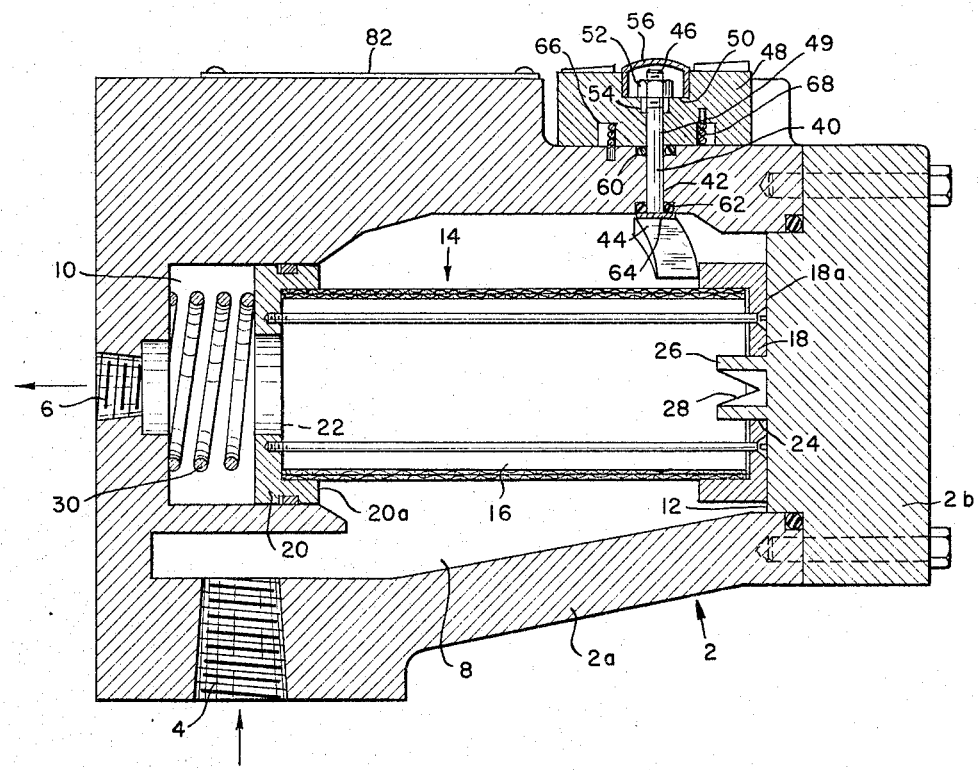

Oct. 4, 1966  N. O. ROSAEN  3,276,586
INDICATING MEANS FOR FLUID FILTERS
Filed Aug. 30, 1963

INVENTOR
NILS O. ROSAEN
BY Hutchinson & Milans
ATTORNEYS

# United States Patent Office 3,276,586
Patented Oct. 4, 1966

3,276,586
INDICATING MEANS FOR FLUID FILTERS
Nils O. Rosaen, Bloomfield Hills, Mich., assignor to The Rosaen Filter Company, Hazel Park, Mich., a corporation of Michigan
Filed Aug. 30, 1963, Ser. No. 305,785
10 Claims. (Cl. 210—90)

This invention relates generally to improved rotary indicating means, and more particularly to improved indicating and seal means for indicating the position of a movable filter cartridge in a pressure fluid filtering device.

In the U.S. Patent No. 3,053,389 to O. E. Rosaen et al., and in the copending patent application Serial Number 26,046, filed May 2, 1960, in the names of O. E. Rosaen et al., and now abandoned, in favor of continuation-in-part application Ser. No. 351,640, filed December 11, 1963 filtering devices are disclosed which include a fluid pressure housing in which is mounted a filter cartridge unit that is automatically shiftable between filtering and nonfiltering (i.e., "by-passing") positions in accordance with the filtering condition of the element. Thus as the filter becomes clogged with particles and contaminates during prolonged use, the filter cartridge is axially shifted against the force of opposing biasing means, to a by-pass position wherein the oil or other fluid flows directly from the inlet to the outlet of the housing.

It has been proposed to provide such filter devices with indicating means which present a visual indication, externally of the housing, of the relative position of the filter cartridge, thus indicating at all times the state of cleanliness (i.e., the fluid conducting condition) of the filter. As disclosed in the afore-mentioned patent application, use of rotary-arm type indicators has been proposed which include a shaft mounted in an opening in the housing, an actuating member connected with the shaft within the housing for operation by the movable filter to rotate the shaft, and indicator means, such as a pointer or the like, connected with the shaft externally of the housing.

One major problem which is incurred in the design of such filtering devices is the possibility of leakage of high pressure oil through the indicator shaft opening in the housing. Even when conventional seal means are provided, during continued use of the apparatus there tends to occur a certain end play in the shaft which, if not alleviated, results in leakage of the oil from the housing.

Another problem is the difficulty of rigidly connecting the indicator element to the shaft while at the same time permitting free adjustability of the angular relationship between the actuating member and the indicating element. In operation, the filtering devices are generally subjected to extremely rugged use, severe impacts and continued vibration (as might occur, for example, when the filtering device is used with the hydraulic system of heavy earth-moving apparatus). Thus it is important that the indicator element be rigidly connected with the shaft, and further that the element itself be of massive, durable construction (preferably in the form of a dial type indicator having little or no projecting portions which might otherwise be subjected to breakage or engagement with other parts). On the other hand, it is desirable for the connection between the indicating element and the shaft to be releasable in order that the angular relationship between the indicating element and the actuating member might be adjusted either at the factory or in the field. In the prior art, set screw means have been proposed for rigidly connecting the indicating element with the shaft. If the set screw extremity is designed to cooperate with a keyed portion of the shaft, it is obviously impossible to achieve the desired angular adjustment between the indicating and actuating members. Furthermore, if the set screw extremity is designed to abut a cylindrical portion of the shaft, the disadvantage occurs that tightening of the set screw causes marring of the cooperating shaft surface, thereby hindering subsequent fine angular adjustment of the indicating element on the shaft. The present invention was developed to avoid the above and other drawbacks of the known indicating means.

An object of the present invention is to provide improved indicating means including a shaft rotatably mounted in an opening in a housing, said shaft having a first smooth cylindrical portion outside the housing, an indicating element mounted on said first shaft portion, said indicating element including two leg portions defined by a radially extending slot, and means clamping said leg portions together to rigidly connect the indicating element to the shaft. In accordance with the invention, the indicating element is a dial and the slot contained therein extends diametrically for a distance greater than the dial radius. Secured to the free end of the shaft within the housing is an actuating member arranged for engagement by the movable filter cartridge for rotating the shaft and dial. According to an important feature of the invention, upon loosening of the clamping means, the indicating element may be accurately adjusted angularly relative to the actuating member.

According to another object of the invention, means are provided for moving the indicating element axially of the shaft in the direction of the actuating member without affecting the preset angular relationship between the indicating element and the actuating member. In this regard, the free extremity of the shaft includes a second threaded portion upon which is mounted hex nut means or the like. Under certain conditions, the hex nut may be tightened without release of the clamping means, whereby the preset angular relationship is maintained as the two elements are drawn together toward, and on opposite sides of, the housing wall.

According to a further object of the invention, improved fluid sealing of the indicator shaft opening in the housing is obtained by placing O-ring seals in counterbored recesses at opposite ends of the opening. These O-rings extend slightly beyond the adjacent housing surfaces, whereby upon tightening of the afore-mentioned hex nut means to draw the actuating and indicating elements toward each other, the O-rings are compressed and end-play of the shaft is eliminated.

Figure 2:
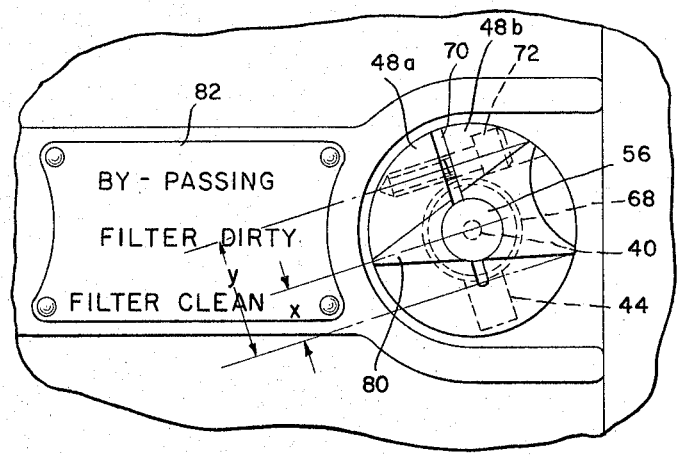

Other objects and advantages of the invention will become apparent from a study of the following specification when considered in conjunction with the accompanying drawing, in which:

FIG. 1 is a sectional view of a filter device incorporating the improved indicating means of the present invention, and FIG. 2 is a detailed plan view of the dial indicator.

Referring to FIG. 1, the filter housing 2, having separable sections 2a and 2b, includes an inlet 4 and an outlet 6 affording communication with an internal chamber 8. Adjacent outlet 6 the housing is provided with a cylindrical bore 10. The wall 12 of chamber 8 opposite bore 10 is flat and has a roughened surface. Mounted for sliding movement in housing chamber 8 intermediate inlet 4 and outlet 6 is a filter cartridge 14 which comprises a tubular filter element 16 upon the opposite ends of which are mounted the flanged metal caps 18 and 20. Cap 20 includes a central through passage 22 which affords continuous communication between outlet 6 and the interior of tubular filter element 16. Cap 18 includes a central opening 24 which slidably receives tubular housing projection 26. Projection 26 is provided with a plurality of axially extending, tapered by-pass slots 28. The outer diameter of the annular flanged portion of cap 20 corresponds with the diameter of bore 10, and consequently cap 20 and bore 10 define a piston and cylinder, respectively. Compression spring 30 mounted in bore 10 biases filter cartridge 14 to the right toward the illustrated position in engagement with wall surface 12. As described in the afore-mentioned Rosaen et al. patent, oil entering chamber 8 via inlet 4 normally passes radially inwardly through fiter element 16 and axially outwardly through opening 22, bore 10 and outlet 6. Should filter element 16 become partially clogged during use, the fluid pressure in chamber 8 external of filter element 16 increases relative to the fluid pressure in bore 10 and within filter element 16. Owing to the roughened chamber wall surface 12, a small portion of the fluid is present between surface 12 and the adjacent surface 18a of cap 18. As a result of the difference between inlet and outlet pressures, the forces acting on the cartridge surfaces 20a and 18a exceed the opposing pressure forces, and consequently cartridge 14 is shifted to the left against the counteracting force of spring 30. If the filter element should be further clogged during use, the increase in the pressure differential between inlet and outlet pressures causes cartridge 14 to be shifted further to the left, whereupon cap 18 reaches a position exposing by-pass slots 28. Inlet fluid in chamber 8 now by-passes the filter element 16 and flows to outlet 6 via by-pass slots 28, the interior of filter element 16, opening 22 and bore 10.

In accordance with the present invention, improved fluid-sealed indicator means are provided for indicating the position of filter cartridge 14 relative to housing 2 (and consequently the filtering condition—i.e., the state of cleanliness—of filter element 16). The indicator means includes a shaft 40 rotatably mounted in a through bore 42 in housing 2 adjacent and spaced from chamber wall surface 12. Rigidly secured to one end of shaft 40 within chamber 8 is an indicator lever 44 the free end of which is adapted to engage the annular flange of end cap 18. The other end of shaft 40 extends through the housing and terminates in a threaded portion 46. Rotatably mounted upon shaft 40 adjacent the external surface of housing 2 is an indicating dial 48 containing a cylindrical bore 49 receiving shaft 40, and a first counterbore 50 for receiving hex nut 52 which is threaded upon shaft portion 46. Beneath hex nut 52, dial 48 contains a second smaller counter-bored portion 54 which extends below the threaded shaft portion 46 as shown. Protective cap 56, which is formed of light gauge metal, is snap-fit into the upper extremity of counterbore 50 above hex nut 52.

Adjacent the upper and lower ends of bore 42, the housing is provided with counterbored recesses in which are mounted O-ring seals 60 and 62, respectively. The upper and lower surfaces of these annular seals extend slightly beyond the adjacent surfaces of housing 2, respectively. Flat washer 64 is mounted on shaft 40 intermediate O-ring 62 and indicator lever 44.

The lower surface of dial 48 contains an annular recess 66 in which is mounted a helical spring 68 the opposite ends of which are connected with housing 2 and dial 48, respectively. Spring 68 biases shaft 40 in the counter-clockwise direction (as viewed in FIG. 2) to effect continuous contiguous engagement between the extremity of lever 44 and end cap 18.

In accordance with an important feature of the invention, releasable means are provided for rigidly connecting dial 48 with shaft 40. Referring to FIG. 2, it will be seen that dial 48 contains a diametrically extending through-slot 70 the length of which is greater than the radius of the dial. This slot 70 passes through the center of the dial, and consequently through the central dial bore 49 which slidably and rotatably receives a corresponding smooth cylindrical portion of shaft 40. Thus the slot defines two leg portions 48a and 48b in dial 48. Intermediate shaft 40 and the free end of slot 70 is arranged a clamping screw 72 the axis of which is normal to the vertical plane passing through slot 70 and the axis of dial 48. The head of screw 72 is recessed in a counterbored portion of dial leg 48b, and the shank portion of the screw extends through a bore in leg 48b, through the slot 70, and into screw threaded engagement with an aligned threaded bore in leg 48a. Since the distance "y" between the inner end of slot 70 and the axis of screw 72 is greater than the distance "x" between the slot end and the axis of shaft 40, upon tightening screw 72, a mechanical advantage is achieved for clamping the dial legs 48a and 48b upon shaft 40 whereby an extremely rigid connection is obtained. It is important to note that since shaft 40 and dial bore 49 have corresponding smooth right-cylindrical surfaces, the clamping together of the dial legs is achieved without marring of shaft 40. Such marring or surface deformation of shaft 40, as occurs with the use of conventional set screw securing means, is to be avoided since it hinders subsequent accurate angular adjustment of the dial relative to shaft 40.

The upper surface of dial 48 is provided with a pointer portion 80 which cooperates with an indicator plate 82 secured to housing 2 to indicate the angular position of lever 44 in chamber 8.

In operation, it will be apparent that as cartridge 14 shifts to the left upon partial clogging of filter element 16, cap 18 engages lever 44 and rotates shaft 40 and dial 48 in the clockwise direction against the counteracting force of spring 68. Dial 48 is thus rotated from the "FILTER CLEAN" to the "FILTER DIRTY" position. If the filter element 16 should be so clogged as to cause cartridge 14 to be shifted further to the left to the by-passing position, lever 44, shaft 40 and dial 48 are further rotated in the clockwise direction against spring 68 to cause pointer 80 to be in the "BY-PASSING" position. It is apparent that upon cleaning of the filter element, cartridge 14 is shifted to the right by spring 30, whereupon dial 48, shaft 40 and lever 44 are rotated in the counter-clockwise direction by spring 68 to maintain lever 44 in engagement with cap 18.

The degree of angular movement of dial 48 relative to axial movement of the filter cartridge is, of course, a function of the length of lever 44 as well as the location of shaft 40 with regard to the longitudinal axis of the cartridge.

A particularly important feature of the invention is the fluid sealing function afforded by O-rings 60 and 62. During factory assembly, dial 48 is positioned on shaft 40 to have a predetermined angular relationship relative to lever 44, whereupon hex nut 46 is tightened upon threaded shaft portion 46 to effect compression of O-rings 60 and 62, and screw 72 is tightened to rigidly clamp dial 48 upon shaft 40. Preferably the O-rings are so dimensioned that in this compressed condition the lateral surfaces of the rings extend slightly above and below the corresponding outer and inner housing wall surfaces. Assume that after continued use of the filter device in a high pressure hydraulic system, it should be desired to further compress the O-ring seals to avoid leakage through bore 42. Upon removal of protective cap 56, hex nut 52 is tightened upon threaded shaft portion to draw dial 48 and lever 44 together and thereby further compress O-rings 60 and 62 to take up end play in shaft 40. The counterbore 54 insures that the threads on threaded portion 46 do not act as a brake on the bored surface of dial 48 during this tightening of hex nut 52. Under certain circumstances it may be desired to use a washer 64 having an outer diameter which is less than the diameter of the recess containing O-ring 62. In this case, the washer is permitted to be drawn partially into the recess for further compression of O-ring 62.

Since shaft 40 and bore 49 have smooth cylindrical surfaces, in general this tightening of hex nut 52 may be accomplished without loosening of the clamping screw 72. This offers the advantage that the preset angular relationship between dial 48 and lever 44 is not disturbed during the tightening of nut 52 and the further compression of the O-rings. However, with the exercise of proper skill and care, it is possible, if circumstances should so require, to slightly loosen screw 72 during initial tightening of hex nut 52. Prior to final tightening of the hex nut, screw 72 might again be completely tightened so that dial 48 (and consequently, shaft 40 and indicator 44) will be held stationary during completion of the tightening of hex nut 52.

Although dial 48 is preferably formed of metal, it is possible, under certain circumstances, to use a dial formed from another hard material (such as a suitable synthetic plastic material or the like). In any event, the dial must be somewhat resilient to permit clamping movement of legs 48a and 48b.

While in accordance with the provisions of the Patent Statutes the best known embodiment of tthe invention has been illustrated and described, it will be apparent to those skilled in the art that changes may be made in the apparatus described without deviating from the invention set forth in the following claims.

What is claimed is:

1. Indicating means comprising
a support containing a through bore;
a shaft mounted for rotation in said bore;
an actuating member secured to said shaft on one side of said support;
an indicating element containing a through opening, said indicating element being mounted by means of said opening on a first portion of said shaft on the other side of said support, said indicating element containing also a through-slot extending in a direction normal to said shaft, said slot extending from a first point on the peripheral surface of said indicating element to a second point spaced from and on the other side of said shaft from said first point, thereby defining a pair of leg portions on said indicating element, said first shaft portion having a smooth right cylindrical surface, said shaft including also a threaded second portion extending at one end beyond said indicating element;
means on the opposite side of said shaft from said second point for clamping together the legs of said indicating element to rigidly connect said indicating element with said shaft;
and means cooperating with said threaded second shaft portion for drawing said indicating element and said actuating member relatively toward each other.

2. In combination with a fluid pressure device including
a housing containing a chamber, an inlet, and an outlet, and a first member mounted for movement in said chamber;
indicating means for indicating the position of said member in said chamber comprising
a shaft mounted for rotation in a through bore in said housing;
an actuating member in said chamber secured to said shaft, said actuating member being arranged for engagement by said first member to rotate said shaft upon movement of said first member;
an indicating element containing a through opening, said indicating element being external of and adjacent said housing, a first portion of said shaft having a smooth cylindrical surface extending through the opening in said indicating element, said indicating element containing also a through-slot extending in a direction normal to said shaft, said slot extending from a first point on the peripheral surface of said indicating element to a second point spaced from and on the opposite side of said shaft from the first point, thereby defining a pair of leg portions on said indicating element;
means on the opposite side of said shaft from said second point for clamping together the legs of said indicating element to rigidly connect said indicating element with said shaft;
said housing containing at opposite ends of the bore therein a pair of counterbored recesses;
a pair of O-ring seals mounted, respectively, in said housing recesses, said O-ring seals normally having surface portions which extend slightly beyond the adjacent surfaces of said housing;
said shaft having a threaded second portion extended at one end on the opposite side of said indicating element from said housing;
and means cooperating with said threaded second shaft portion for drawing said indicating element and said actuating member toward each other and said housing to thereby compress said O-ring seals.

3. Apparatus as defined in claim 2 wherein said movable member in said housing chamber comprises a filter cartridge which is mounted for reciprocation in said chamber;
and further including first spring means biasing said filter cartridge in a given direction in said chamber;
means responsive to the filtering state of said filter for moving said cartridge in the opposite direction against the biasing force of said second spring means upon clogging of the filter;
and second spring means rotatably biasing said shaft in a direction to maintain said actuating member in continuous engagement with a portion of said filter cartridge.

4. Apparatus as defined in claim 2 wherein the through opening in said indicating element consists of a through bore the radius of which is greater than the width of said slot.

5. Apparatus as defined in claim 4 wherein the width of said slot is uniform on the opposite sides of said bore.

6. Apparatus as defined in claim 5 wherein the free end of the bore in the indicating element includes a counterbored recess receiving, in spaced relationship, that end portion of the threaded second portion of said shaft which is adjacent the shaft first portion.

7. Apparatus as defined in claim 6, and further including a washer mounted on said shaft between said actuating member and the adjacent one of said O-rings.

8. Apparatus as defined in claim 7 wherein said indicating element is formed of a resilient material.

9. Apparatus as defined in claim 8 wherein said indicating element comprises a dial, said slot extending diametrically of the dial and having a length greater than the dial radius.

10. Indicating means comprising
a shaft having a first portion provided with a smooth cylindrical surface;
a dial containing a central cylindrical bore by means of which said dial is rotatably mounted on said shaft first portion, said dial containing a through slot which extends partially through said dial in a direction normal to the axis of said shaft, said slot extending diametrically from a first point on the periphery of said dial to a second point on the opposite side of said shaft from said first point, said slot defining a pair of leg portions on said dial;
and means intermediate said shaft and said first point on the dial for drawing the leg portions of said dial together to rigidly clamp said dial to said shaft.

References Cited by the Examiner

UNITED STATES PATENTS

| | | | |
|---|---|---|---|
| 1,463,321 | 7/1923 | Jacobson | 116—124.2 |
| 1,857,573 | 5/1932 | Strebe et al. | 287—52.02 |
| 2,269,821 | 1/1942 | Kemphert et al. | 74—230.1 |
| 2,761,415 | 9/1956 | Waite | 116—136.5 |

REUBEN FRIEDMAN, *Primary Examiner.*

SAM ZAHARNA, *Examiner.*